(12) United States Patent
Tanizawa et al.

(10) Patent No.: US 9,240,882 B2
(45) Date of Patent: Jan. 19, 2016

(54) KEY GENERATING DEVICE AND KEY GENERATING METHOD

(71) Applicants: Yoshimichi Tanizawa, Kanagawa (JP); Shinichi Baba, Bristol (GB)

(72) Inventors: Yoshimichi Tanizawa, Kanagawa (JP); Shinichi Baba, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/714,809

(22) Filed: Dec. 14, 2012

(65) Prior Publication Data

US 2013/0251154 A1    Sep. 26, 2013

(30) Foreign Application Priority Data

Mar. 23, 2012 (JP) ................................. 2012-067719

(51) Int. Cl.
*H04L 29/06* (2006.01)
*H04L 9/08* (2006.01)

(52) U.S. Cl.
CPC ................ *H04L 9/08* (2013.01); *H04L 9/0827* (2013.01); *H04L 9/0861* (2013.01)

(58) Field of Classification Search
CPC ......... H04L 9/00; H04L 63/045; H04L 63/18; H04L 63/062; H04L 9/08; H04L 9/0827; H04L 9/0861; H04N 21/00; H04W 12/00
USPC ....................... 713/171, 190, 191; 726/20, 26; 380/223, 226, 228, 259, 260, 264, 43, 380/277–286
See application file for complete search history.

(56) References Cited

U.S. PATENT DOCUMENTS

| 6,044,396 | A  | * | 3/2000  | Adams ............................ 725/95 |
| 6,535,607 | B1 | * | 3/2003  | Chandersekaran et al. .. 380/286 |
| 6,594,361 | B1 | * | 7/2003  | Chaney et al. ................. 380/221 |
| 8,041,039 | B2 | * | 10/2011 | Tajima et al. .................. 380/279 |
| 8,594,323 | B2 | * | 11/2013 | Dondeti ........................... 380/44 |
| 2004/0184603 | A1 | | 9/2004 | Pearson et al. |
| 2005/0021610 | A1 | * | 1/2005 | Bozionek et al. ............. 709/203 |

(Continued)

FOREIGN PATENT DOCUMENTS

| JP | 9-18468 A | 1/1997 |
| JP | 2008-154019 | 7/2008 |

OTHER PUBLICATIONS

O. Maurhart, "QKD Networks Based on Q3P", Applied Quantum Cryptography, Lect. Notes Phys., vol. 797, Chapter 8, 2010, pp. 151-171.

(Continued)

*Primary Examiner* — Chau Le
*Assistant Examiner* — Muhammad Chaudhry
(74) *Attorney, Agent, or Firm* — Oblon, McClelland, Maier & Neustadt, L.L.P.

(57) ABSTRACT

According to an embodiment, a key generating device connected to an external device includes a generating unit configured to generate an encryption key; a first communicating unit configured to transmit and receive the encryption key to and from the external device; a storage unit configured to stores therein state information indicating a communication state with respect to an application using the encryption key; and a controller configured to make a control of changing a frequency at which the generating unit generates the encryption key or a frequency at which the first communicating unit transmits and receives the encryption key according to the state information.

8 Claims, 7 Drawing Sheets

(56) References Cited

U.S. PATENT DOCUMENTS

| | | | |
|---|---|---|---|
| 2005/0094814 A1* | 5/2005 | Aihara | 380/247 |
| 2006/0288209 A1* | 12/2006 | Vogler | 713/168 |
| 2007/0230688 A1* | 10/2007 | Tajima et al. | 380/30 |
| 2008/0013738 A1* | 1/2008 | Tajima et al. | 380/278 |
| 2008/0147820 A1* | 6/2008 | Maeda et al. | 709/213 |
| 2010/0058082 A1* | 3/2010 | Locker et al. | 713/320 |
| 2011/0064222 A1* | 3/2011 | Wiseman | 380/255 |
| 2013/0163446 A1* | 6/2013 | Kruger et al. | 370/252 |

OTHER PUBLICATIONS

Mehrdad Dianati, et al., "Architecture and protocols of the future European quantum key distribution network", Security and Communication Networks, vol. 1, 2008, pp. 57-74.

Office Action issued Jul. 8, 2014 in Japanese Patent Application No. 2012-067719 (with English language translation).

Office Action issued Oct. 9, 2015 in Chinese Patent Application No. 201310053238.6 (with English language translation).

* cited by examiner

FIG.3

| ID OF CORRESPONDENT NODE | GENERATION SOURCE INFORMATION | APPLICATION KEY |
|---|---|---|
| Nc | 1 | Ac1 |
| Nc | 0 | Ac2 |

FIG.4

| ID OF APPLICATION | ID OF NODE |
|---|---|
| Aa1 | Na |
| Ab1 | Nb |
| Ac1 | Nc |

FIG.5

| SESSION IDENTIFIER | ID OF CORRESPONDENT NODE | ID1 OF APPLICATION | ID2 OF APPLICATION | SESSION STATE | REQUEST THROUGHPUT |
|---|---|---|---|---|---|
| S1 | Nc | Aa1 | Ac1 | CONNECTED | ... |
| ⋮ | ⋮ | ⋮ | ⋮ | ⋮ | ⋮ |
| ⋮ | ⋮ | ⋮ | ⋮ | ⋮ | ⋮ |

KEY GENERATING DEVICE AND KEY GENERATING METHOD

CROSS-REFERENCE TO RELATED APPLICATIONS

This application is based upon and claims the benefit of priority from Japanese Patent Application No. 2012-067719, filed on Mar. 23, 2012; the entire contents of which are incorporated herein by reference.

FIELD

Embodiments described herein relate generally to a key generating device and a key generating method.

BACKGROUND

An encryption communication network is known which is configured by a plurality of networked nodes connected to each other through a plurality of links. Each node has a function of generating and sharing a random number with an oppoising node connected through the link, and a function of performing encryption communication on the link using the random number as an encryption key (hereinafter, a link key). In addition, some of the nodes each have a function of generating a random number independently of the link, and a function of transmitting the generated random number to the other nodes. An application in the encryption communication network has a function of acquiring the random number from the node, and performing the encryption communication with another application using the random number as the encryption key (hereinafter, refer to as an application key). The application may be integrally implemented in the node, or may be implemented as a terminal independently of the node.

In the node, the function of generating and sharing the random number (the link key) between the oppoising nodes connected through the link, for example, is generally implemented by a technique called a quantum encryption communication. In this case, a technique of generating the random number (the application key) in the node independently of the link and transmitting the generated random number to another node through the link may be referred to as a quantum key distribution (QKD).

However, a specific sequence of generating of timing at which the random number (the application key) is generated independently of the link and a frequency thereof is not clearly disclosed in the conventional technique, so that it is difficult to efficiently generate and share the application key.

BRIEF DESCRIPTION OF THE DRAWINGS

FIG. 3 is a diagram illustrating an example of application key information;
FIG. 4 is a diagram illustrating an example of correspondence information;
FIG. 5 is a diagram illustrating an example of session information.

DETAILED DESCRIPTION

According to an embodiment, a key generating device connected to an external device includes a generating unit configured to generate an encryption key; a first communicating unit configured to transmit and receive the encryption key to and from the external device; a storage unit configured to stores therein state information indicating a communication state with respect to an application using the encryption key; and a controller configured to make a control of changing a frequency at which the generating unit generates the encryption key or a frequency at which the first communicating unit transmits and receives the encryption key according to the state information.

Herein below, a preferred embodiment will be described in detail with reference to the accompanying drawings.

The key generating device (node) according to the embodiment controls a frequency of generating an application key and a frequency of transmitting and receiving (exchanging) the application key to and from another node according to a communication state with respect to an application using an encryption key (the application key).

Figure 1:
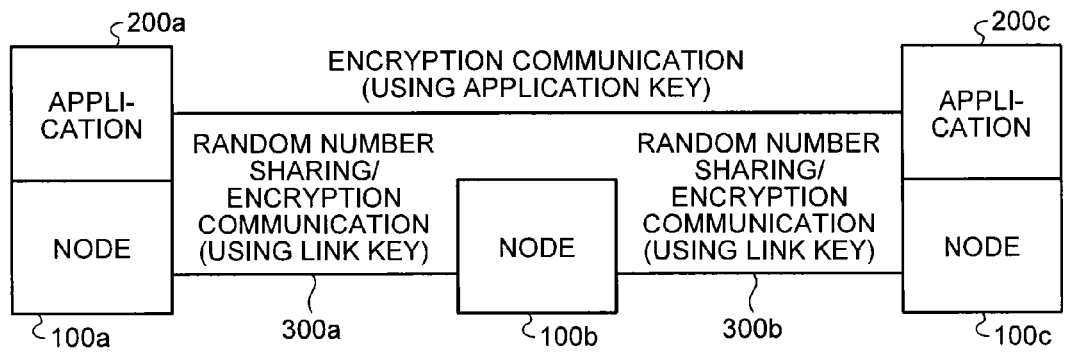
FIG. 1 is a diagram illustrating a network configuration of a communication system according to an embodiment.

FIG. 1 is a diagram illustrating a network configuration of a communication system according to an embodiment. The communication system includes nodes 100a to 100c serving as the key generating device and applications 200a and 200c.

In a case where there is no need to distinguish the nodes 100a to 100c from each other, it may be simply referred to as the node 100. In a case where there is no need to distinguish the applications 200a and 200c, it may be simply referred to as the application 200. The number of the nodes 100 is not limited to 3. In addition, the number of the applications 200 is not limited to 2.

As described above, the nodes 100a to 100c each have a function of generating and sharing a random number with the oppoising nodes and a function of performing encryption communication on the link using the generated random number as a link key.

The node 100 may have a function of generating the random number independently of the link and a function of transmitting the generated random number to another node. Herein below, the description will be made on the assumption that the nodes 100a and 100c (the nodes to be connected to the applications 200a and 200c) have these functions. Specifically, as illustrated in FIG. 1, an example of a network configuration below will be described.

The network is configured such that the node 100a and the node 100b are connected through a link 300a which is the encryption communication network, and the node 100b and the node 100c are connected through a link 300b which is the encryption communication network.

The application 200a performs the encryption communication with the application 200c.

The application 200a acquires the application key from the node 100a for the encryption communication.

The application 200c acquires the application key from the node 100c for the encryption communication.

Figure 2:
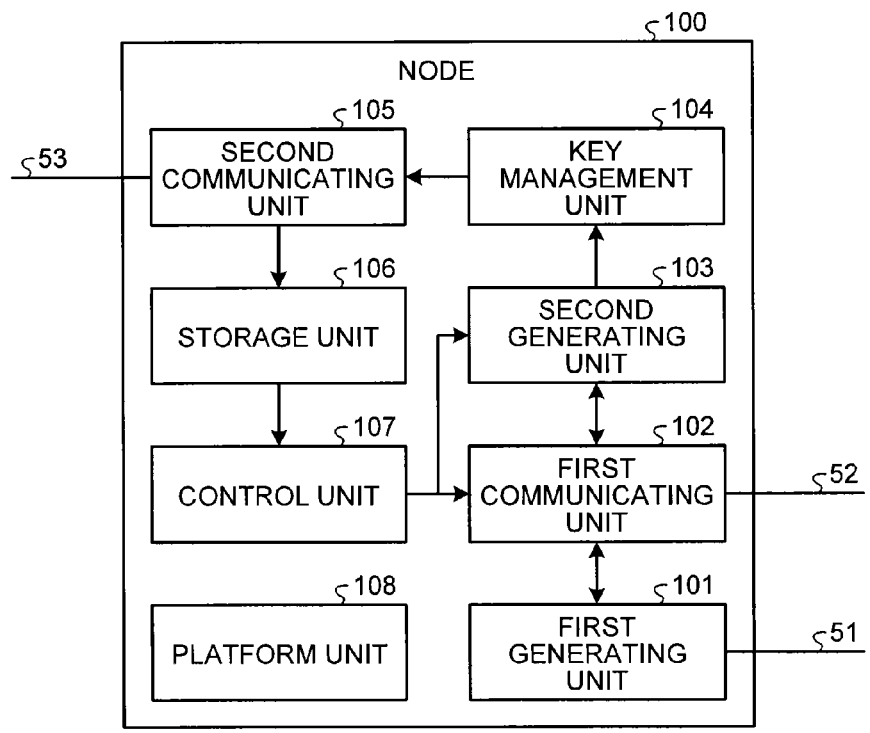
FIG. 2 is a block diagram illustrating a node.

FIG. 2 is a block diagram illustrating an example of a configuration of the node 100. As illustrated in FIG. 2, the node 100 is provided with a first generating unit 101, a first communicating unit 102, a second generating unit 103, a key managing unit 104, a second communicating unit 105, a storage unit 106, a control unit 107, and a platform unit 108.

The first generating unit 101 generates and shares the random number with the opposing node connected through a link (a link-key generating/sharing link) 51 in which the link key is generated and shared. The first generating unit 101 manages the generated random number as the link key. The link key, for example, is stored and managed in a storage device (a random access memory (RAM), a hard disk drive (HDD), and the like) located inside or outside the first generating unit 101.

The first generating unit 101, for example, generates the random number using a quantum encryption communication technique. A method of generating the random number is not limited thereto, and any known method of generating the random number may be applied.

The first communicating unit 102 is used when data is transmitted or received (inter-node data communication) to and from another node 100 (an external device) connected through a link 52 which is a communication link (inter-node communication link) to the another node 100. Herein, the link 52 may be the same as the link 51, or different from each other. In addition, an opposing node connected to the link 52 may be the very opposing node connected to the link 51, or different from each other.

The other node 100 which is a correspondent in the inter-node data communication may be the opposing node (the node 100b for the node 100a) directly connected through the link 52, or still another node 100 (for example, the node 100c for the node 100a) further connected to another node of the opposing node thereof through the communication link. In this case, the first communicating unit 102 may provide a routing function for performing communication through a plurality of the nodes 100 over the encryption communication network. In addition, the inter-node data communication may be encrypted using the link key which has been generated and shared by the first generating unit 101.

The second generating unit 103 has a function of generating the random number independently of the first generating unit 101, and sharing the generated random number with the other node 100. When the random number is shared with the other node 100, the function of the first communicating unit 102 may be used. The random number which has been generated and shared by the second generating unit 103 is referred to as the application key. When the timing or/and the frequency of generating or/and sharing the application key, and the node 100 for exchanging the application key are to be determined, the second generating unit 103 refers to session information (the details will be described below) which is stored in the storage unit 106.

The key managing unit 104 manages the application key which has been generated and shared by the second generating unit 103. The key managing unit 104 selects an appropriate application key in response to a request from the second communicating unit 105 and then transfers the selected application key.

FIG. 3 is a diagram illustrating an example of application key information which is stored in the key managing unit 104. The application key information represents information which is used for the key managing unit 104 to manage the application key. The application key information represents a sharing state of the application key in each node 100. As illustrated in FIG. 3, the application key information includes an ID of a correspondent node, generation source information, and the application key.

The ID of the correspondent node is information (for example, an IP address) for identifying the node 100 which becomes a correspondent sharing the application key. The generation source information is information for specifying a generation source of the application key. For example, in a case where the generation source information is 1, it represents that the subject device has generated the application key. In a case where the generation source information is 0, it represents that another node 100 sharing the application key has generated the application key.

In general, the node 100 shares the application key with a plurality of other nodes 100. In addition, the node 100 shares a plurality of the application keys with another node 100.

The application key information just has to include at least the ID of the correspondent node and the application key, and for example, the generation source information may not be included. In addition, the application information may include the application key itself, and alternatively include the link to the application key or only the ID of the application key. In addition, the application key information is not distinguished for each session (key use session) which uses the application key.

The key managing unit 104 specifies a relation of connection between the application 200 and the node 100, for example, with reference to correspondence information (the application directory) stored in a storage (not illustrated). FIG. 4 is a diagram illustrating an example of the correspondence information. As illustrated in FIG. 4, the correspondence information includes the ID of the application and the ID of the node. The ID of the application represents information for identifying the application 200. The ID of the node represents information for identifying the node 100 which is connected to the corresponding application 200. The ID of the application and the ID of the node, for example, are an IP address of the application 200 and an IP address of the node 100, respectively.

For example, in the example of FIG. 1, the node 100a which receives a notification from the application 200a trying to use the application key in communication with the application 200c is necessary to specify, from the information of the application 200c, the node 100c which is a node connected to the application 200c. The key managing unit 104 of the node 100a refers to the specification information as illustrated in FIG. 4 for the node specification.

A method for each node 100 to acquire the specification information is not particularly limited. For example, the node 100 which accepts a registration from the application 200 may notify all the nodes 100 of the information. Alternatively, a predetermined server may be dedicated to manage the specification information, and each node may query the specification information to the server as needed.

The description will be continued with reference back to FIG. 2. The second communicating unit 105 is used when the data communication is performed with the application 200 which is connected to the application 200 through the communication link (the application communication link). For example, the second communicating unit 105 accepts the request from the application 200, and provides the application key to the application 200.

Herein, since there is no definition on the application communication link, the application 200 may be present in another computer connected to the node 100 through some kind of network. In this case, the network through which the node 100 and the application 200 are connected may be configured to implement existing network security functions such as a firewall, data encryption, and data authentication. The application 200 may present in the node 100 and connected to the second communicating unit 105 through a software API (Application Program Interface).

The communication between the application 200 and the node 100 (that is, the second communicating unit 105), that is, the communication for requesting and acquiring the application key between the node 100 and the application 200 is managed using the session information. The session information is information (state information) representing a communication state between the node 100 and the application 200.

In addition, when the application 200 performs the encryption communication, two nodes 100 connected from the application 200 share the same or associated session information on the encryption communication. In other words, for example, when the application 200a and the application 200c perform the encryption communication, the session information is managed between the application 200a and the node 100a, and the session information is managed between the node 100c and the application 200c. These two sessions are identical or associated with each other.

For this reason, the second communicating unit 105 may perform communication with the application 200 using any kind of session control protocol. As an example of the session control protocol, a session initiation protocol (SIP) may be used. Further, the second communicating unit 105 may be configured to relay the information relating to the session control to another node 100 through the encryption communication network (for example, from the node 100a to the node 100c). When the communication is performed with the other node 100, the second communicating unit 105 can use the first communicating unit 102.

When the second communicating unit 105 verifies the request from the application 200 and as a result it is verified, the communication with the application 200 may be executed. Herein, the verification includes to confirm the application key use right of the application 200, to confirm the completeness in request data, and the like.

The description will be continued with reference back to FIG. 2. The storage unit 106 stores therein the session information to be updated through the communication between the second communicating unit 105 and the application 200 for every key use session. For example, the state of the session is shifted (updated) by the second communicating unit 105 through the communication with the application 200. In addition, for example, the second communicating unit 105 registers corresponding session information at the time of starting the key use session and deletes the corresponding session information after the key use session is terminated.

FIG. 5 is a diagram illustrating an example of session information. As illustrated in FIG. 5, the session information includes a session identifier, an ID of a correspondent node, an ID1 of the application, an ID2 of the application, a state of the session, and a request throughput.

The session identifier is information for identifying the session. The ID of the correspondent node is the ID of the node 100 serving as the correspondent. The ID1 of the application is the ID of the application 200 which corresponds (connected) to the subject device. The ID2 of the application is the ID of the application 200 which corresponds (connected) to the node 100 serving as the correspondent.

The request throughput represents a usage frequency of keys which are requested by the application 200 (the application 200 identified by the identifier ID1 of the application) corresponding to the subject device. The application 200, for example, requests the generation (use) of a safe application key to the node 100 for every occurrence of the communication. For example, such a generation of the application key for every occurrence of the communication is required for the communication in which a theoretically-indecipherable one time pad cipher is used. The application 200, for example, updates the throughput (the request throughput) of generating necessary keys according to a predictable communication volume or the like, and notifies the node 100 of the throughput. The node 100 stores the notified request throughput in the session information. How to specify the request throughput is not limited, and for example, it may specify the number of the application keys necessary per unit hour.

The respective IDs included in the session information, for example, may be represented by the IP address, or a set of the IP address and a port number. In addition, the session identifier may be represented using the IP address (or the IP address and the port number) of the corresponding application 200. In this case, the ID1 of the application may not be provided.

Figure 6:
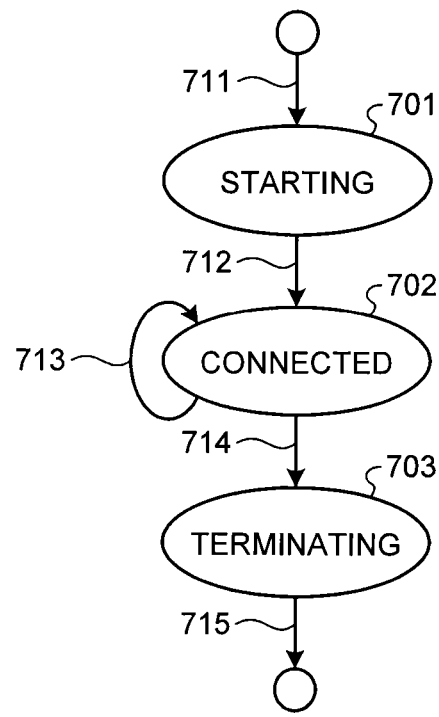
FIG. 6 is a diagram illustrating an example of states of a session.

FIG. 6 is a diagram illustrating an example of the states of the session. FIG. 6 illustrates an example of the states of the session including three states of "starting", "connected", and "terminating", and state transition between the states. However, the states of the session are not limited thereto.

The transition from the initial state to the "starting" state (state 701) occurs, for example, when the node 100 receives a request for starting the use of the application key from the corresponding application 200 (transition 711). The transition from the "starting" state to the "connected" state (state 702) occurs, for example, when the node 100 starts to provide the application key to the corresponding application 200 (transition 712).

When the node 100 receives a request for updating the request throughput from the corresponding application 200, the state is shifted from the "connected" state to the "connected" state (transition 713).

The transition from the "connected" state to the "terminating" state (state 703) occurs, for example, when the node 100 receives a request for stopping the use of the application key from the corresponding application 200 (transition 714).

The "terminating" state is shifted to the terminating state, for example, when the node 100 completely deletes the session information from the corresponding application 200 (transition 715).

The description will be continued with reference back to FIG. 2. The control unit 107 controls the generating and the sharing of the application key between other nodes 100 by referring to the session information as illustrated in FIG. 5. For example, the control unit 107 updates the frequency, at which the second generating unit 103 generates the application key, based on the number of the key use sessions in the connected session state, the total value of the request throughput, the number of pieces of the session information managed by the storage unit 106 for each correspondent node, and the like. In addition, the control unit 107 updates the frequency, at which the first communicating unit 102 transmits the application key to another node 100, based on the number of the key use sessions in the connected session state, the total value of the request throughput, the number of pieces of the session information managed by the storage unit 106 for each correspondent node, and the like.

The frequency of generating the application key is a frequency at which the second generating unit 103 generates the application key (the random number) independently of the first generating unit 101. The frequency of sharing (exchanging) the application key is a frequency at which the already generated application key is transmitted and received (exchanged) for sharing the key to and from the node 100 of the correspondent. In a case where the application key is generated and also transmitted and received, the both (the frequency of generating the application key and the frequency of sharing the application key) may be treated as the same meaning.

For example, the control unit 107 increases the frequency of generating the application key according to the increase in number of the key use sessions of the connected state. It does not matter how much the frequency increases, but for example, the frequency of generating the application key may increase so as to be proportional to the number of the key use sessions. In addition, for example, the control unit 107 causes the frequency of generating the application key to increase according to the increase of the total value of the request throughput included in the session information of each key use session.

In addition, the control unit 107 determines the node 100, which generates or/and shares the application key, based on the ID of the correspondent node included in the session information.

Further, in a case where the session information is deleted, that is, in a case where the encryption communication is not performed with the application 200 connected to another node 100, the control unit 107 may terminate the operation of generating and sharing the application key with the other node 100.

The platform unit 108 provides functions of an operating system of a computer necessary for managing and operating other components on the node 100.

Figure 7:
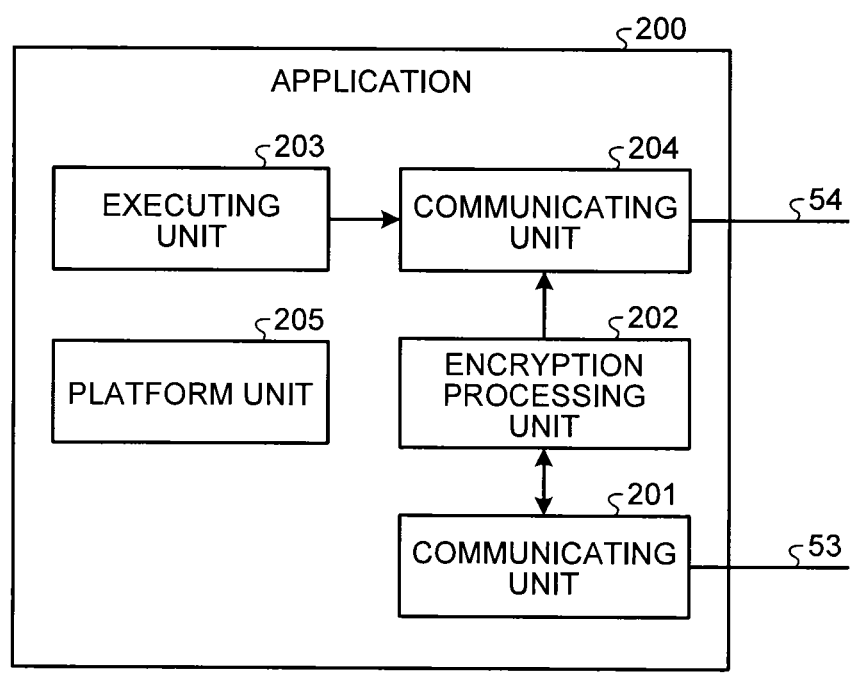
FIG. 7 is a block diagram illustrating an application.

Hereinbefore, the configuration of the node 100 according to the embodiment has been described. Next, an exemplary configuration of the application 200 according to the embodiment will be described. FIG. 7 is a block diagram illustrating an example of a configuration of the application 200 according to the embodiment. As illustrated in FIG. 7, the application 200 includes a communicating unit 201, an encryption processing unit 202, an executing unit 203, a communicating unit 204, and a platform unit 205.

The communicating unit 201 is connected to the node 100 (specifically, the second communicating unit 105 of the node 100) through the communication link (a link 53), and transmits and receives various kinds of data to and from the node 100. For example, the communicating unit 201 acquires the application key necessary for performing the encryption communication from the node 100. The communicating unit 201 may establish the session with the node 100 when performing communication to acquire the application key from the node 100. The information on the session may be shared, through the node 100, with the application 200 which becomes a correspondent in the encryption communication by the application 200 and the node 100 connected to the application 200.

For example, when the encryption communication is performed between the application 200*a* and the application 200*c*, the application 200*a* and the node 100*a* establish a key use session, and the application 200*c* and the node 100*c* also establish a key use session which is identical or associated with the key use session. For this reason, the communicating unit 201 may perform the communication with the node 100 using any kind of session control protocol.

The encryption processing unit 202 performs an encryption processing using the application key. For example, the encryption processing unit 202 stores the application key acquired by the communicating unit 201 and performs the encryption processing and decryption processing on necessary data using the application key after the encryption communication. Further, an available cryptographic algorithm is not particularly limited. For example, a block cipher such as an advanced encryption standard (AES) may be used, or a Vernam cipher such as a one-time pad (OTP) may be used.

The executing unit 203 executes an application function of performing the encryption communication. The kinds of application functions are not limited as long as communication is performed through the application function. For example, the executing unit 203 executes a function such as a video transmission. The executing unit 203 delivers transmission data to the communicating unit 204 and receives reception data from the communicating unit 204.

The communicating unit 204 provides a communication function necessary for the operations of the executing unit 203. In addition, when the data communication is performed, the communicating unit 204 may encrypt or decrypt the data using the encryption processing unit 202. When receiving the transmission data from the application 200, the communicating unit 204 encrypts the data using the encryption processing unit 202, and transmits the data through a data communication link (a link 54). The data communication link is a link for transmitting and receiving data to and from the application 200 of the correspondent. In addition, when receiving data from the data communication link, the communicating unit 204 decrypts the received data using the encryption processing unit 202, and delivers the decrypted data to the application 200.

The platform unit 205 provides functions of an operating system of a computer necessary for managing and operating other components on the application 200.

Hereinbefore, the configuration of the application 200 according to the embodiment has been described. The description above is an example, for example, the application 200 may have only a function (the communicating unit 201) of controlling writing and reading of the storage used to store the application key.

Figure 8:
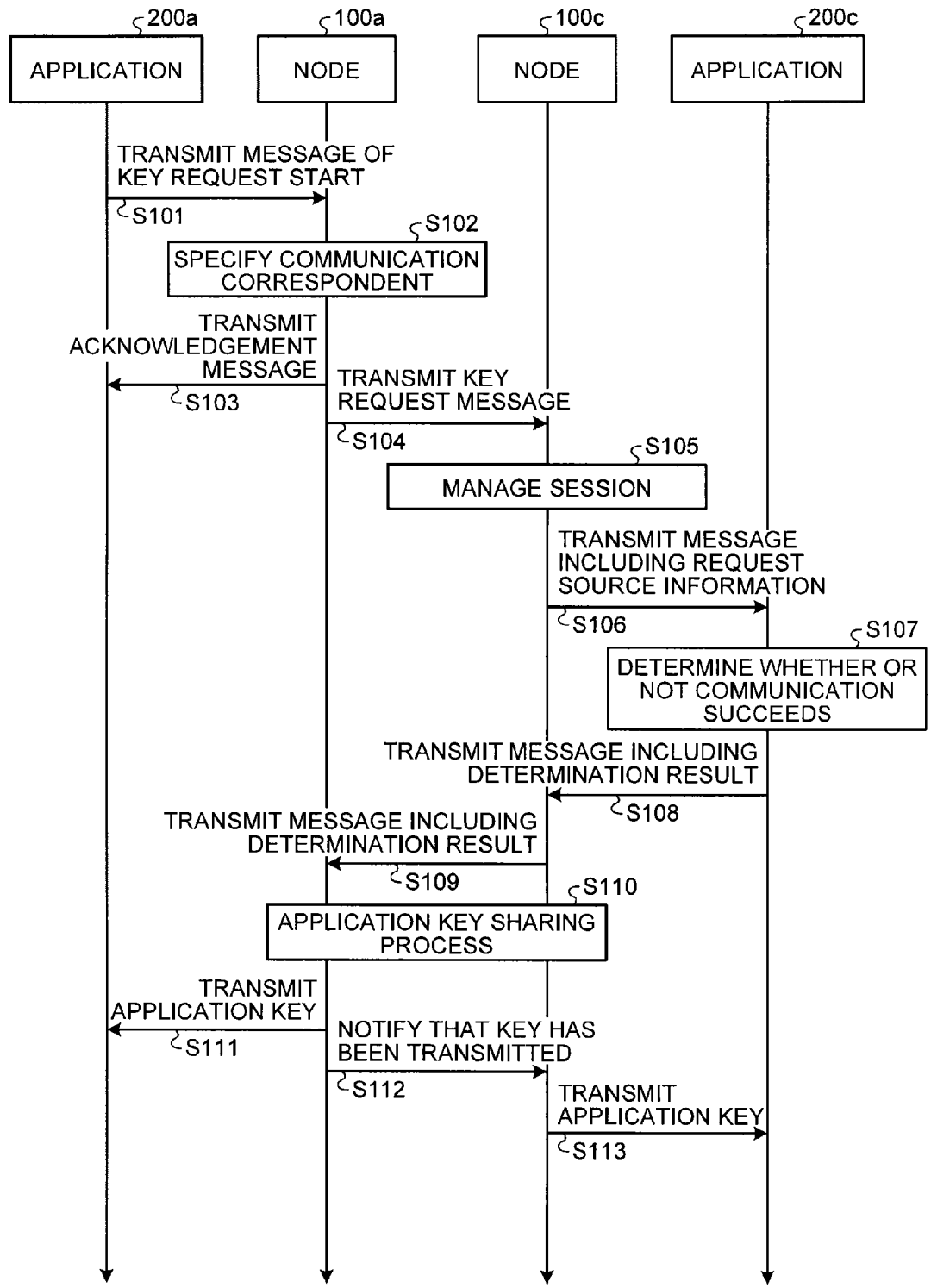
FIG. 8 is a sequence diagram illustrating a session starting process.

Next, three basic sequences according to the embodiment will be described. FIG. 8 is a sequence diagram illustrating an entire flow of a session starting process according to the embodiment. The session starting process is performed among the application 200*a*, the node 100*a*, the node 100*c*, and the application 200*c* when the application 200*a* starts the encryption communication with the application 200*c*.

The application 200*a* transmits a message (a start request message) to the node 100*a* to start a request of the application key (step S101). The start request message, for example, includes information on the ID (the port number to be connected to the IP address) of the application 200*c* which becomes a correspondent in the encryption communication of the application 200*a*.

The start request message may include the session identifier for identifying the session to be established (for example, the IP address allocated to the application 200*a*, and the port number of the application 200*a* used for the application 200*a* to communicate with the application 200*c*). Further, the start request message may include information on the usage frequency of the application key which is considered to be used when the application 200*a* performs the encryption communication with the application 200*c* (for example, the request throughput related to a communication throughput which is predicted by the application 200*a* with respect to the application 200*c*), and the like.

At this point of time, the second communicating unit 105 of the node 100*a* starts to manage the information on the key use session, and the session state thereof is shifted to the starting state.

Meanwhile, as described above, there is no particular limitation on a message format and a protocol of the second communicating unit 105 for transmitting the start request message to make a communication between the application 200 and the node 100. For example, the session control protocol may be used. As an example of the session control protocol, the SIP may be used.

The node 100a which has received the start request message specifies a correspondent, for example, using a function of the application directory illustrated in FIG. 4 (step S102). For example, the key managing unit 104 of the node 100a specifies the application 200c which is the correspondent specified by the application 200a, and the node 100c which is the node 100 to be used when the application 200c is in the encryption communication.

In addition, the second communicating unit 105 generates the session information in which the session identifier (which is generated if necessary) associated with the corresponding encryption communication, the application 200a, the node 100c, and the application 200c are associated with each other, and stores the generated session information in the storage unit 106. The second communicating unit 105 may transmit a message to the application 200a to acknowledge that the node 100a has specified the application 200c and the node 100c (step S103).

The first communicating unit 102 of the node 100a transmits a message (a key request message) to the node 100c, which includes the information on the ID of the application 200c (for example, the port number to be connected to the IP address) which is the information acquired through the start request message and the session identifier associated with the corresponding encryption communication (step S104). The key request message may include information on the node 100a and the application 200a which are transmission sources of the messages. The message exchange between the node 100a and the node 100c is generally encrypted and carried out through a link 300 illustrated in FIG. 1.

Further, there is no particular limitation on the message format and a protocol for communication between the nodes (the node 100a and the node 100c) for transmitting the key request message. The first communicating unit 102 may use the same message format and protocol as those described above for communication between the application 200a and the node 100a, or may use different format and protocol. For example, the session control protocol may be used. As an example of the session control protocol, the SIP may be used.

When receiving the key request message, the second communicating unit 105 of the node 100c generates, from the data included in the key request message, the session information in which the associated session identifier, the application 200a, the node 100a, and the application 200c are associated with each other, and stores the generated session information in the storage unit 106 (step S105). The second communicating unit 105 may notify the application 200c of a message (a request source message) which includes the information on the ID of the application 200c included in the key request message (step S106). In addition, the request source message may include information on the node 100a and the application 200a which are transmission sources of the messages.

At this point of time, the second communicating unit 105 of the node 100c starts to manage the information on the key use session, and the session state thereof is shifted to the starting state.

The application 200c determines whether or not the encryption communication with the application 200a is allowed, based on the information included in the request source message regarding the node 100a and the application 200a which are the transmission sources of the messages, or based on the information on the usage frequency of the application key indicated by the application 200a (for example, the request throughput associated with the communication throughput with the application 200c predicted by the application 200a) (step S107). The application 200c may notify the node 100c of the determination result as a message (a result message) (step S108).

When receiving the result message, the node 100c notifies the node 100a of the result message (step S109).

The node 100a starts an application key sharing process in which the application key for the key use session is generated and assigned (step S110). Specifically, the control unit 107 starts to share the application key with the node 100c using the second generating unit 103 and the first communicating unit 102. Further, in a case where the node 100c receives the application key which has been generated and shared by the node 100a, the node 100c may transmit a reception acknowledge message to the node 100a.

Hereinafter, the application key sharing process between the node 100a and the node 100c continues until the state of the session is shifted to the terminated state. At this time, the control unit 107 determines the frequency of performing the application key sharing process based on the information (the request throughput) on the usage frequency of the application key stored in the node 100a. The control unit 107 may determine that a correspondent for sharing the application key to be generated is the node 100c based on that the node associated with the key use session is the opposing node. Further, the control unit 107 may determine the usage frequency of the application key based on information obtained by referring to the session information other than the corresponding key use session such as a state of another key use session stored therein (for each opposing node), and the total usage frequency of the other application keys (for each opposing node).

The node 100a notifies the application 200a of one of the keys which are shared with the node 100c (step S111). A message (a key notifying message) for the notification may include information of the session identifier. In addition, at this point of time, the state of the key use session stored in the node 100a is shifted to the connected state.

The node 100c is also notified an event, which caused by the key notifying message from the node 100a, of notifying the application 200a of the application key (step S112). Note that, the application key may be shared by a message generated for notification at this time.

The node 100c notifies the application 200c of one of the keys which are shared with the node 100a (step S113). The message (the key notifying message) for the notification may include information of the session identifier. In addition, at this point of time, the state of the key use session stored in the node 100c is shifted to the connected state.

Figure 9:
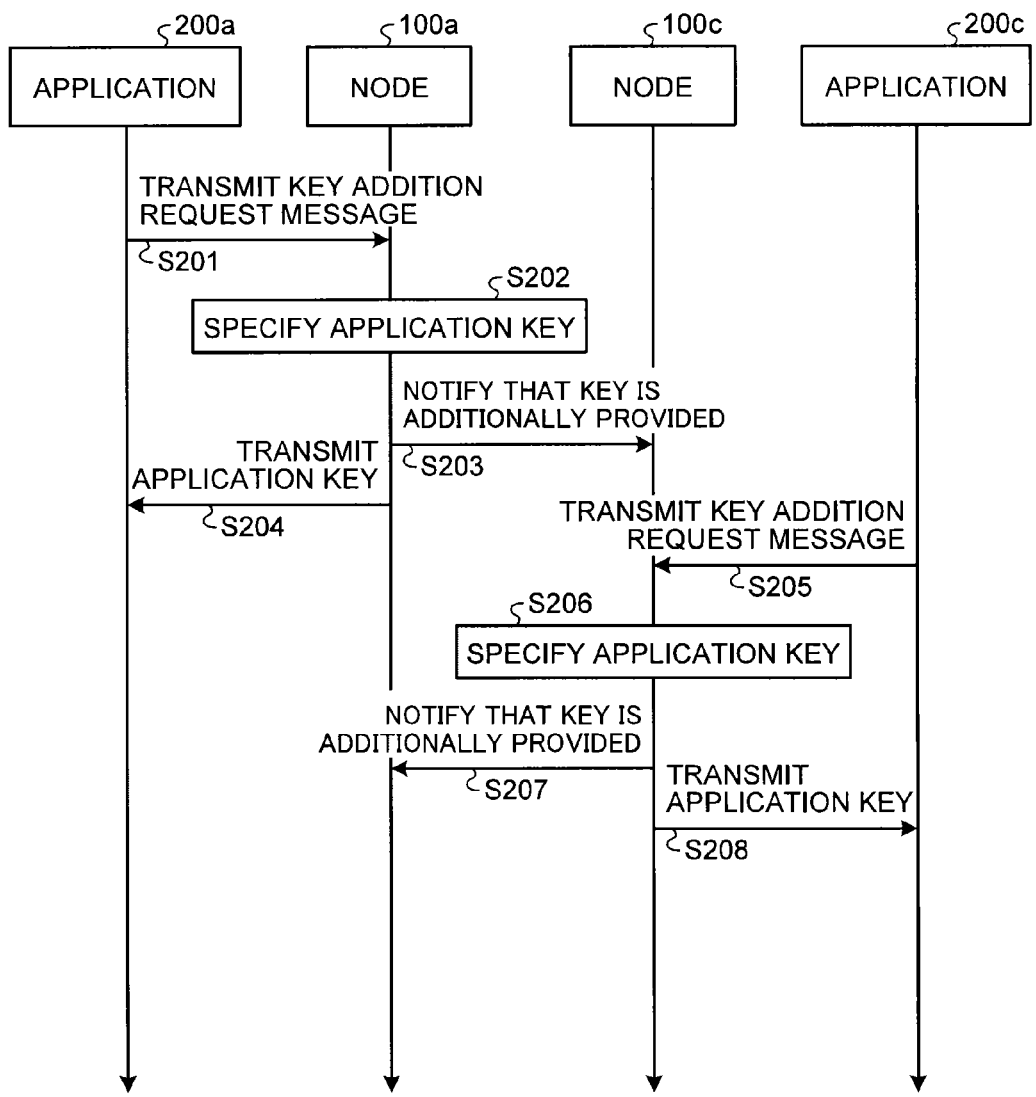
FIG. 9 is a sequence diagram illustrating a session continuation process.

FIG. 9 is a sequence diagram illustrating an entire flow of a session continuation process according to the embodiment. The session continuation process is performed when the application key is acquired from the node 100a or the node 100c because the application 200a and the application 200c in the encryption communication need a new application key as data is transmitted and received.

The application 200a transmits a message (an additional request message) to the node 100a to make an additional request for the application key (step S201). The additional request message may include the session identifier, the size of the application key to be requested, and the usage of the application key to be requested (for transmission or for reception).

The key managing unit 104 of the node 100a which has received the additional request message specifies the application key which will be delivered to the application 200a from the session identifier included in the additional request message and the like (step S202). At this time, the second communicating unit 105 transmits a message for notifying the node 100c separately specified by the session identifier that the application key is additionally provided to the application 200a (step S203), and the provision of the application key from the node 100c to the application 200c may be performed in synchronization with the transmission.

In this case, the node 100c which receives the notification through the message transmitted in step S203 may notify the application 200c of the message including the application key (not illustrated). In this case, the main sequences from step S205 to step S208 may not be executed.

The second communicating unit 105 of the node 100a notifies the application 200a of a message including the specified additional application key (step S204). The message may include information of the session identifier.

Since the key use session is in the connected state even when these application keys are being additionally provided, the application key sharing process between the node 100a and the node 100c (step S110 of FIG. 8) is continuously performed.

The application 200c transmits a message (the additional request message) to the node 100c to make an additional request for the application key (step S205). The additional request message may include the session identifier, the size of the application key to be requested, and the usage of the application key to be requested (for transmission or for reception). In general, the usage is in reverse to that indicated in the application 200a. For example, when encrypted data is received from the application 200a, the additional request message may start to be transmitted in order to acquire the application key to decrypt the data.

The key managing unit 104 of the node 100c which has received the additional request message specifies the application key which will be delivered to the application 200c from the session identifier and the like included in the additional request message (step S206). At this time, the second communicating unit 105 transmits a message for notifying the node 100a separately specified by the session identifier that the application key is additionally provided to the application 200c (step S207), and the provision of the application key from the node 100a to the application 200a may be performed in synchronization with the transmission.

The node 100c notifies the application 200c of a message including the specified additional application key (step S208). The message may include information of the session identifier.

As illustrated in FIG. 8, in the embodiment, when the request for starting the use of the application key is made, the application key sharing process starts. Then, a generation frequency or an exchange frequency of the application key is controlled according to the session state, so that a necessary amount of the application keys can be shared among the plurality of nodes 100. With this configuration, when the need arises, the application 200 can perform the encryption communication without being short of the application key. In other words, as illustrated in FIG. 9, in a case where an additional application key is actually requested, it is possible to provide the application key which is generated and exchanged at an appropriate frequency to the application 200. In this way, according to the embodiment, the application key can be efficiently generated and shared.

Figure 10:
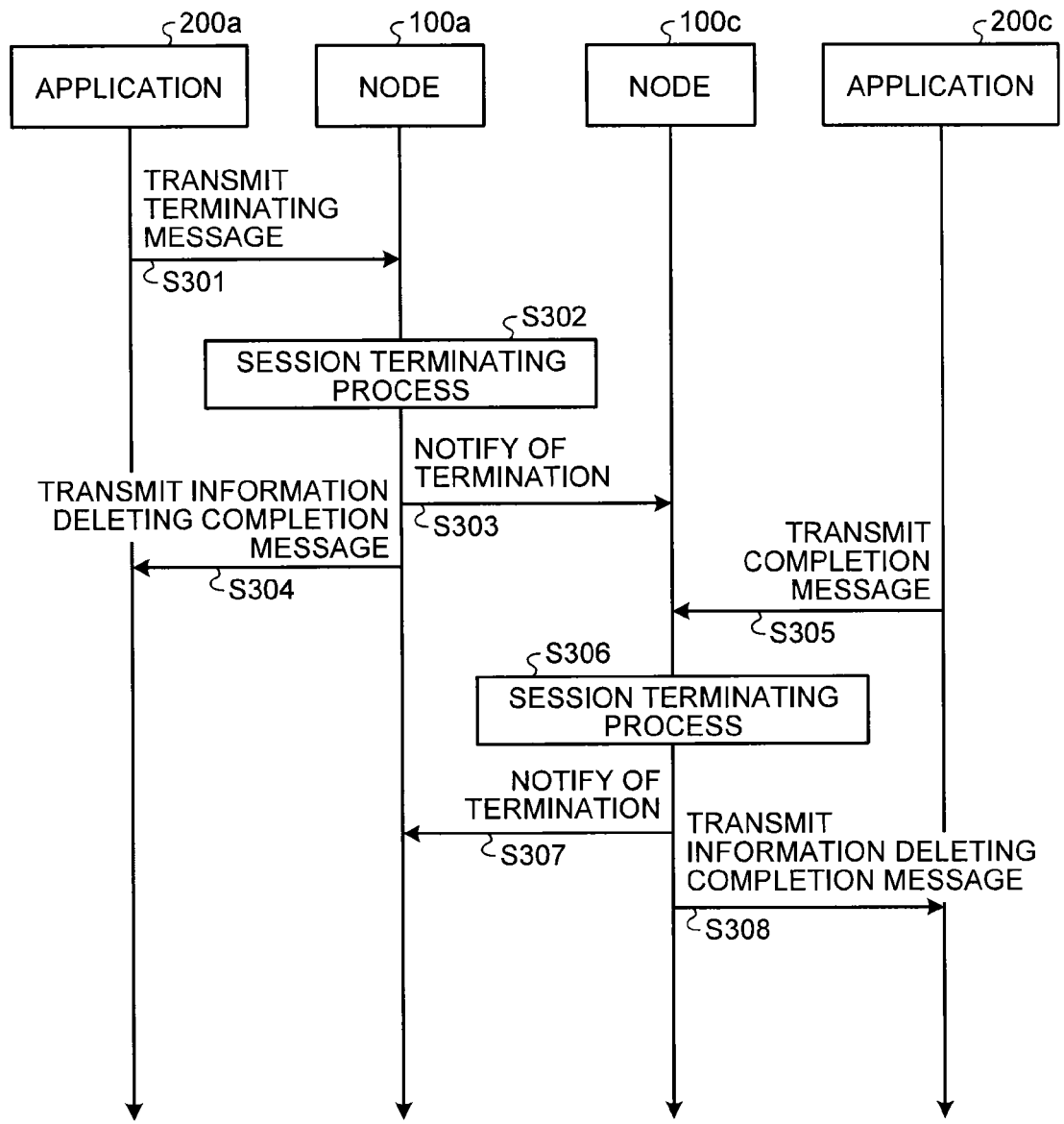
FIG. 10 is a sequence diagram illustrating a session termination process.

FIG. 10 is a sequence diagram illustrating an entire flow of a session termination process according to the embodiment. The session termination process is executed in order to terminate the encryption communication which is being executed between the application 200a and the application 200c, and to terminate the key use session when there is no need to use the application key any more.

The application 200a transmits a message (a terminating message) to the node 100a to notify that the application key is not used any more (step S301). The terminating message may include the session identifier and the like.

The second communicating unit 105 of the node 100a receives the terminating message. At this point of time, the state of the key use session which has been stored in the node 100a is shifted to the terminating state. In addition, since the state of the session is shifted to the terminating state, the control unit 107 of the node 100a may stop the application key sharing process which is being executed for the key use session with the node 100c.

The second communicating unit 105 of the node 100a executes the session termination process (step S302). For example, the second communicating unit 105 deletes the session information which corresponds to the session identifier included in the received terminating message.

In a case where another session is using the application key, that is, in a case where there is a session whose session state is in the connected state, the application key sharing process may be continuously executed. The node 100a may notify the node 100c of the termination in order to perform the process of terminating the application key which is shared with the node 100c (step S303).

When the information associated with the key use session is completely deleted, the second communicating unit 105 of the node 100a transmits a message (a deleting completion message) to the application 200a to notify that the deleting is completed (step S304). The deleting completion message may include information of the completely deleted key use session. At this point of time, the information regarding the key use session may be deleted from the node 100a.

On the other hand, the application 200c transmits a message (a terminating message) to the node 100c to notify that the application key is not used any more (step S305). The terminating message may include the session identifier and the like.

The second communicating unit 105 of the node 100c receives the terminating message. At this point of time, the state of the key use session which has been stored in the node 100c is shifted to the terminating state. In addition, since the state of the session is shifted to the terminating state, the control unit 107 of the node 100c may stop the application key sharing process which is being executed for the key use session with the node 100a.

The second communicating unit 105 of the node 100c executes the session termination process (step S306). For example, the second communicating unit 105 deletes the session information which corresponds to the session identifier included in the received terminating message.

Note that, in a case where another session is using the application key, that is, in a case where there is a session whose session state is in the connected state, the application key sharing process may be continuously executed. The node 100c may notify the node 100a of the termination in order to perform the process of terminating the application key which is shared with the node 100a (step S307).

When the information associated with the key use session is completely deleted, the second communicating unit 105 of the node 100c transmits a message (a deleting completion message) to the application 200c to notify that the deleting is completed (step S308). The deleting completion message may include information of the completely deleted key use session. At this point of time, the information regarding the key use session may be deleted from the node 100c.

Note that, while not described in the above each sequence, when the request for changing the request throughput is received from the application 200, each node 100 may change the request throughput which is associated with the session information. In this case, the node 100 may notify that the request throughput has been changed even to the correspondent node (the node 100c for to the node 100a), and change the request throughput of the correspondent node as well. Then, the node 100 may change the frequency of generating and sharing the application key according to the changed request throughput.

According to the embodiment as described above, the frequency of generating and the frequency of exchanging the encryption key (the application key) are changed according to the state of the session with respect to the application. With this configuration, the application key can be efficiently generated and shared.

The respective units provided in the node 100 and the application 200 according to the embodiment may be implemented with hardware circuits, and some or all of the units may be implemented with software (programs).

Figure 11:
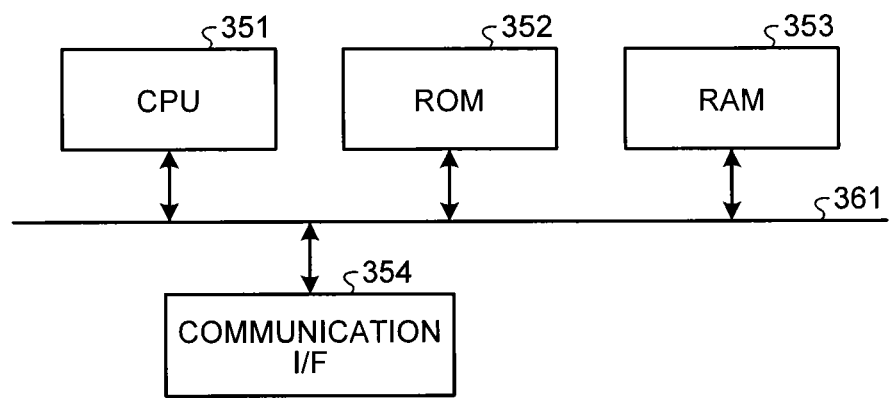
FIG. 11 is a diagram illustrating a hardware configuration of a key generating device according to the embodiment.

Next, a hardware configuration of the key generating device according to the embodiment will be described with reference to FIG. 11. FIG. 11 is a diagram illustrating a hardware configuration of the key generating device according to the embodiment.

The key generating device according to the embodiment is provided with a control device such as a central processing unit (CPU) 351, a storage device such as a read only memory (ROM) 352 and a random access memory (RAM) 353, a communication I/F 354 which is connected to a network to make a communication, an external storage device such as a hard disk drive (HDD) and a compact disc (CD) driver, a displaying device such as a display, an input device such as a keyboard and a mouse, and a bus 361 through which the respective devices are connected to one another. Likewise, a typical computer is used for the hardware configuration.

A key generating program which is executed by the key generating device according to the embodiment is recorded in an installable or executable format onto a computer readable recording medium such as a compact disk read only memory (CD-ROM), a flexible disk (FD), a compact disk recordable (CD-R), and a digital versatile disk (DVD) so as to be provided as a computer program product.

In addition, the key generating program which is executed by the key generating device according to the embodiment may be configured to be provided such that it is stored in a computer connected over a network such as the Internet, thereby downloading the program through the network. In addition, the key generating program which is executed by the key generating device according to the embodiment may be configured to be provided or distributed through the network such as the Internet.

In addition, the key generating program according to the embodiment may be configured to be provided such that it is burned in the ROM 352 and the like in advance.

The key generating program which is executed by the key generating device according to the embodiment is configured in a module including the above-mentioned units (the first generating unit, the first communicating unit, the second generating unit, the key managing unit, the second communicating unit, the storage unit, the control unit, and the platform unit). As actual hardware, a CPU 351 (a processor) reads and executes the key generating program from the recording medium so that the respective units described above are loaded onto a main storage device and generated thereon.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A key generating device which is connected to an external device, comprising:
 a processor configured to
  generate a first encryption key shared with the external device by using a quantum key distribution technique,
  generate a random number as a second encryption key independently of the generation of the first encryption key, and
  transmit and receive the second encryption key to and from the external device through a link that is encrypted using the first encryption key; and
 a memory configured to store therein session information including a communication state and a request throughput that represents a usage frequency of the second key of one or more key-use-sessions established with respect to an application using the second encryption key,
 wherein the processor controls changing a generating frequency at which the second encryption key is generated and controls changing a transmitting/receiving frequency at which the second encryption key is transmitted or received, the control of said changing of the generating frequency and the control of said changing of the transmitting/receiving frequency being based on at least one of the number of key-use-sessions, each key-use-session having the communication state indicating a connected state and a total value of the request throughput that is requested for each of the key-use-sessions.

2. The device according to claim 1, wherein the processors controls updating the usage frequency which is included in the session information stored in the memory in response to a request from the application, and changing the generating frequency or the transmitting/receiving frequency according to the updated usage frequency.

3. The device according to claim 1, wherein the processor transmits and receives information to and from the application according to a predetermined session control protocol, wherein
 the memory stores therein the session information of the key-use-sessions established according to the session control protocol.

4. The device according to claim 3, wherein the session control protocol is a session initiation protocol (SIP).

5. The device according to claim 3, wherein
 the processor verifies a request from the application, and transmits and receives the information to and from the application when the request is verified.

6. The device according to claim 1, wherein
 the memory stores therein the session information of the key-use-sessions established with respect to an application which is provided with a function of storing the second encryption key in a storage.

7. The device according to claim 1, wherein the processor determines, according to the session information, the external device to/from which the second encryption key is to be transmitted and received.

8. A key generating method performed in a key generating device connected to an external device, the method comprising:
- generating a first encryption key shared with the external device by using a quantum key distribution technique;
- generating a random number as a second encryption key independently of the generation of the first encryption key;
- transmitting and receiving the second encryption key to and from the external device through a link that is encrypted using the first encryption key;
- storing, in a memory, session information including a communication state and a request throughput that represents a usage frequency of the second key of one or more key-use-sessions established with respect to an application which uses the second encryption key; and
- controlling, via a processor, changing a generating frequency of generating the second encryption key in the generating of the second encryption key and changing a transmitting/receiving frequency at which the second encryption key is transmitted or received, the control of said changing of the generating frequency and the control of said changing of the transmitting/receiving frequency being based on at least one of the number of key-use-sessions, each key-use-session having the communication state indicating a connected state and a total value of the request throughput that is requested for each of the key-use-sessions.

* * * * *